United States Patent [19]

Treharne

[11] Patent Number: 4,569,102

[45] Date of Patent: Feb. 11, 1986

[54] PUMP NOZZLES

[75] Inventor: Timothy J. Treharne, East Grinstead, England

[73] Assignee: Pemberton Sintermatic S.A., Switzerland

[21] Appl. No.: 495,351

[22] PCT Filed: Sep. 16, 1982

[86] PCT No.: PCT/GB82/00271
§ 371 Date: May 11, 1983
§ 102(e) Date: May 11, 1983

[87] PCT Pub. No.: WO83/00985
PCT Pub. Date: Mar. 31, 1983

[30] Foreign Application Priority Data

Sep. 16, 1981 [GB] United Kingdom ............... 8127984

[51] Int. Cl.⁴ ............................................. A22C 11/02
[52] U.S. Cl. ......................................................... 17/41
[58] Field of Search ................... 17/41, 35, 42, 33, 49

[56] References Cited

U.S. PATENT DOCUMENTS

| 3,071,015 | 1/1963 | Donguy | 74/88 |
| 4,017,941 | 4/1977 | Randys et al. | 17/41 |
| 4,051,574 | 10/1977 | Gaspar | 17/35 |

FOREIGN PATENT DOCUMENTS

| 894686 | 3/1972 | Canada . | |
| 1120724 | 12/1961 | Fed. Rep. of Germany . | |
| 1565356 | 4/1980 | United Kingdom | 17/41 |

Primary Examiner—Willie G. Abercrombie
Attorney, Agent, or Firm—Bacon & Thomas

[57] ABSTRACT

A nozzle for a pump comprises an inner tube (18) and a housing (1,10) with an end wall in which is formed an elliptical outlet (13). The tube (18) is provided with an elliptical opening (21). The outlet and opening are off center and can be brought into registry by rotating the tube (18). Such rotation is effect by means of a sleeve (22) mounted on the housing, connected to the tube (18) by means of a slot (35) receiving a projection (29) on the tube. The sleeve is rotated by means of an axially movable cam follower engaging in a part helical cam surface (24).

7 Claims, 16 Drawing Figures

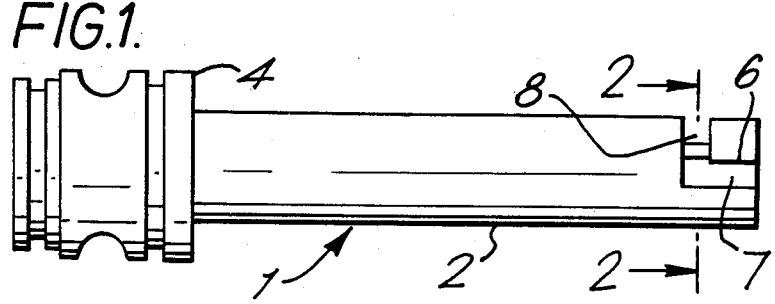
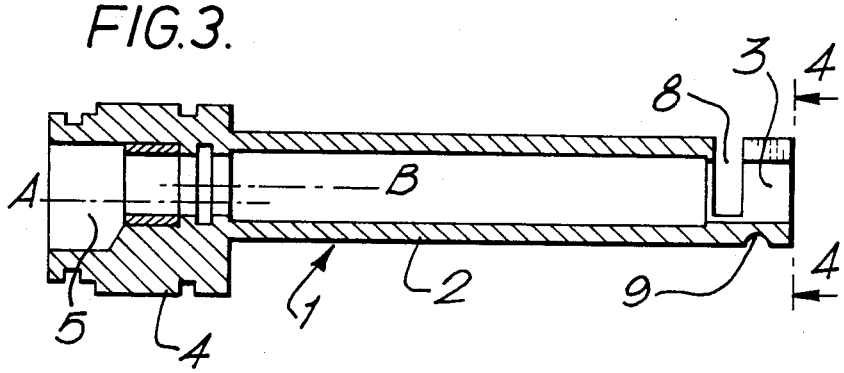
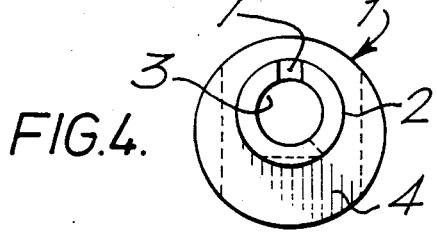

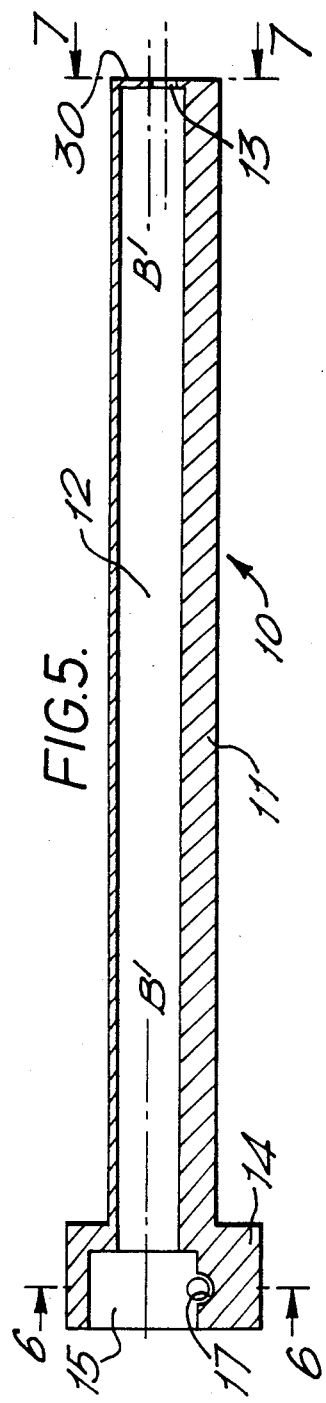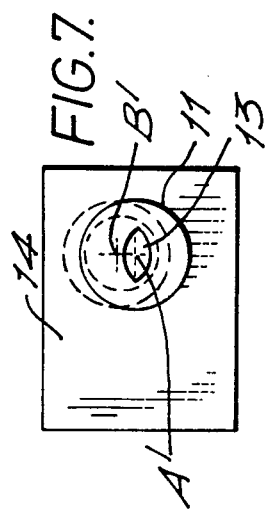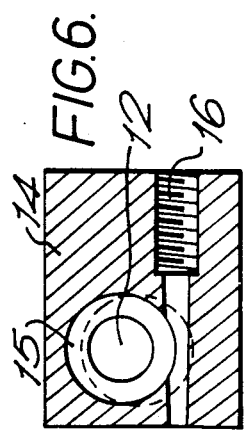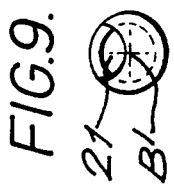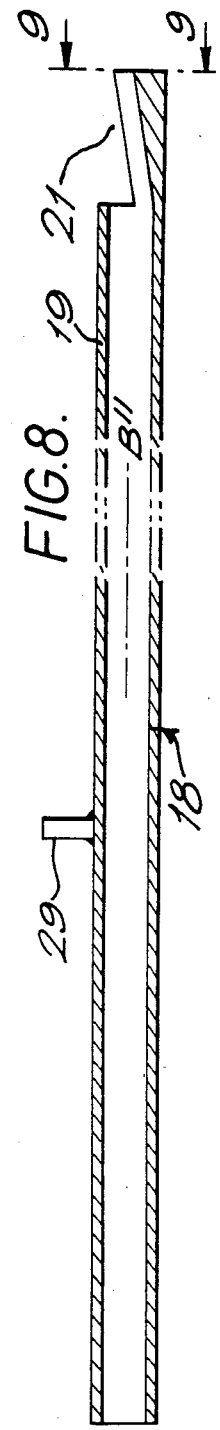

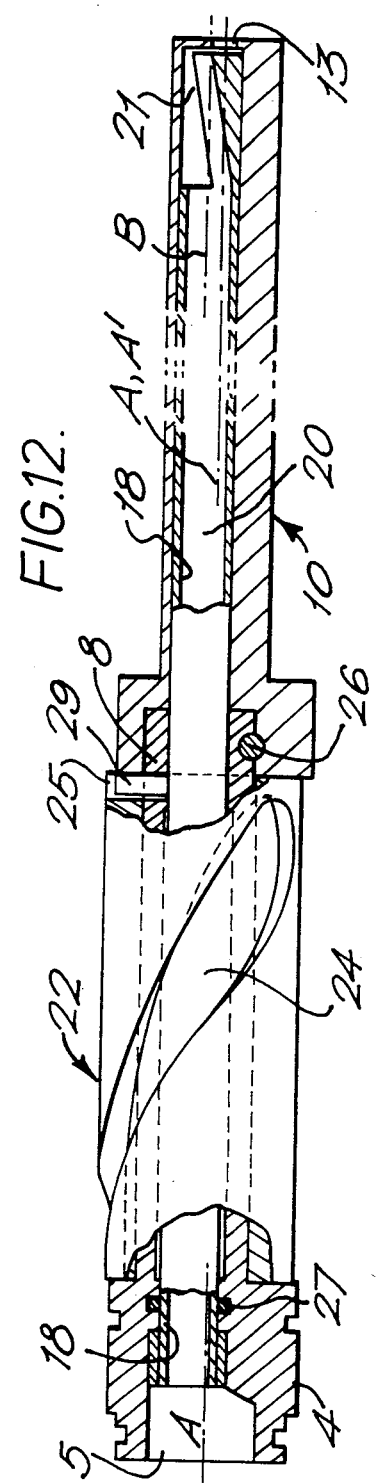

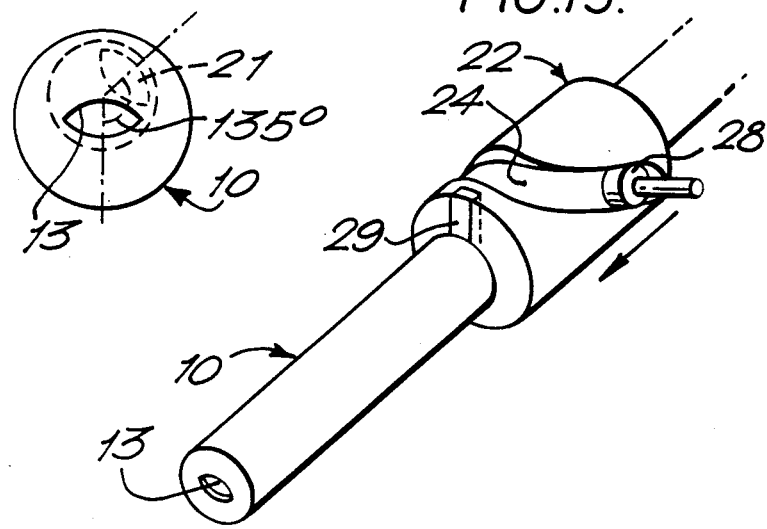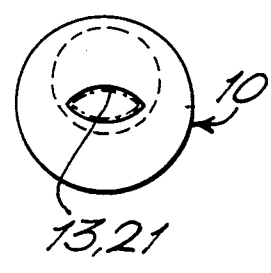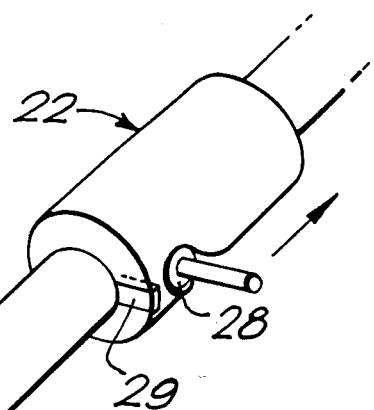

PUMP NOZZLES

This invention relates to nozzles for pumps and the like and relates in particular to a nozzle through which a meat or meat-like paste may be pumped for use in, for example, the production of moulded meat or meat-like products such as sausages.

A number of arrangements are known wherein moulded meat or meat-like products, such as sausages or frankfurters are shaped within a rigid mould cavity. An example of such an arrangement is disclosed in our U.K. Patent Application No. 2004454A which describes an apparatus and method particularly adapted for the production of skinless moulded meat or meat-like products, i.e. products free from an external supporting membrane. In an illustrative example described therein, a skinless sausage is produced by introducing meat paste or other product forming material into a rigid mould cavity having a permeable wall. The ends of the cavity are closed and the surface of the material is treated with a suitable coagulating fluid such as an acid, which is introduced through the permeable walls of the mould cavity and provides the sausage with a cohesive skin. The sausage is then ejected from the cavity which can be continually reused. One or more of such mould cavities may be arranged, for example on a rotatable drum, for relative movement between a plurality of stations where the various operations are carried out.

In order to function satisfactorily, the system requires that an exact, predetermined quantity of meat paste is introduced into the cavity. As disclosed in U.K. No. 2004454A the paste is pumped into the cavity via a cylindrical, open ended nozzle which is introduced into the empty cavity and then gradually retracted as the cavity is filled. After the required predetermined quantity of paste has been pumped through the nozzle, a metering valve shuts off the supply of paste to the nozzle and the nozzle may be completely withdrawn from the cavity. However, this method has proved to have a disadvantage in that, although the supply of paste to the nozzle may be shut off at the appropriate time, the nozzle itself remains full. It has been found that at least some of the residual paste within the nozzle may pass out of the open end thereof and into the mould cavity before the nozzle is completely withdrawn from the cavity.

Thus, even though the supply of meat paste into the nozzle may be carefully monitored, the total quantity which is introduced into the cavity may be too large by an unpredictable amount. This leads to unsatisfactory operation of the apparatus in that the sausages may be misshapened at one end.

It is therefore proposed that a means be provided for closing the end of the nozzle at the appropriate time. A problem is that, particularly in the case of the apparatus described above, the space within the mould cavity is not large. This makes it difficult to design a nozzle closing arrangement which will work effectively within the restricted space available.

According to the invention there is provided a nozzle for a pump comprising a tubular inner member having an inlet connectable to a pump and an axially directed outlet, the tubular member being mounted within an elongate housing having an end wall adjacent the outlet, the end wall having an axially directed aperture therein, and the tubular member and housing being arranged for relative rotation so as either to bring the aperture and outlet into registry or to close the outlet by means of the end wall.

By "axially directed" is meant along or substantially parallel to the longitudinal axis of the tubular member.

Thus, the tubular member and the housing may be relatively rotated between an open position wherein the aperture and the outlet are in registry and fluid may flow freely through and out of the nozzle, and a closed position wherein there is no overlap between the aperture and the outlet and the housing end wall closes the outlet and prevents fluid leaving the nozzle. A major advantage with the inventive nozzle is that the relation rotation between the housing and the tubular member may be effected at a position which is longitudinally remote from the nozzle outlet. Therefore, the outlet or tip of the nozzle may be introduced into a mould cavity of restricted dimensions with the rear end of the nozzle remaining externally accessible and the required relative rotation between the housing and the tubular member to either close or open the outlet may conveniently be effected at the rear end of the nozzle, outside the cavity. Thus, the aforesaid problem of closing the nozzle outlet within a mould cavity of restricted size, so as to prevent spillage from the nozzle of residual fluid left therein after the supply to the nozzle has been shut off, may be overcome.

Preferably, the outlet and the end wall aperture are of similar cross-sections and are both radially displaced from the rotational axis of the tubular member. It has been found that, when the nozzle is used to pump a relatively viscous fluid into a cavity, the cavity is only evenly filled if the outlet and the aperture are generally symmetrical in cross section. Appropriately sized elliptical or eye-shaped openings are particularly advantageous in that they provide a high and even outlet flow.

Preferably, the tubular inner member is in the form of an elongate cylinder which is rotatably mounted in an elongate cylindrical bore formed in the housing, which bore terminates at the housing end wall.

Thus the relative rotation between the tubular member and the housing is effected by rotating the tubular inner member with the housing held stationary. In one particularly advantageous arrangement for injecting a viscous fluid such as meat paste into a mould, a tubular sleeve is rotatably mounted on the housing towards the rear end thereof, the sleeve being coupled to the tubular inner member whereby rotation of the sleeve causes a like rotation of the inner member. The sleeve advantageously has a cam surface formed along its length shaped as part of a spiral. A cam follower is advantageously positioned adjacent, and is selectively axially movable with respect to the sleeve. The cam follower cooperates with the cam surface whereby axial movement of the cam follower with respect to the sleeve causes rotation of the sleeve and a corresponding rotation of the inner member.

In a preferably arrangement, means are arranged to introduce the nozzle into a mould cavity with the outlet and the housing aperture out of alignment i.e. in the closed position. As the nozzle is introduced into the mould the cam follower is moved with the cylinder so there is no relative movement therebetween and correspondingly no rotation of the inner member. Once the nozzle is disposed in the mould, the cam follower is moved longitudinally with respect to the sleeve and, by cam action on the spiral cam surface, causes the sleeve and the inner member to rotate through a predetermined angle thereby bringing the outlet and the aperture into registry and opening the nozzle. Material is then pumped into the cavity via the nozzle which is gradually withdrawn from the cavity as the cavity is filled. Once the cavity contains the correct predetermined quantity of fluid, the cam follower is moved in the opposite direction with respect to the sleeve thereby rotating the inner member back to its original position and closing the nozzle. The nozzle can then be completely withdrawn from the cavity and the cycle is ready to be repeated. Since the required movement of the cam follower is in a direction parallel to the direction of the movement of the nozzle into and out of the mould, actuating means for the cam follower may conveniently be incorporated in the means for introducing the nozzle into the mould.

In one particularly advantageous embodiment, the housing comprises separate front and rear segments which are matingly interengagable, the inner member having a radial projection attached thereto which extends through an elongate circumferential slot or keyway formed in the rear segment and engages the rotatable sleeve. Thus, rotation of the sleeve causes a like rotation of the projection within the slot and a corresponding rotation of the inner member.

Preferably, the housing aperture and the nozzle inlet are centered on a central axis of the nozzle, the rotational axis of the inner member being radially offset from the central axis.

A preferred embodiment of the invention will now be described by way of example only with reference to the accompanying drawings, wherein;

FIG. 1 is a plan view of the housing rear segment for a nozzle in accordance with the invention.

FIG. 2 is a sectional view taken along line 2—2 in FIG. 1.

FIG. 3 is a side elevational view, in section, of the segment shown in FIG. 1.

FIG. 4 is a view taken along line 4—4 in FIG. 3.

FIG. 5 is a side elevational view, in section, of the housing front segment for a nozzle in accordance with the invention.

FIG. 6 is a sectional view taken along line 6—6 in FIG. 5.

FIG. 7 is a front elevational view taken along line 7—7 in FIG. 5.

FIG. 8 is a foreshortened side elevational view, in section, of a tubular inner member for a nozzle in accordance with the invention.

FIG. 6 is a front elevational view of the member shown in FIG. 8.

FIG. 10 is a side elevational view of a rotatable sleeve for a nozzle in accordance with the invention.

FIG. 11 is a front elevational view of the sleeve shown in FIG. 10.

FIG. 12 is a foreshortened side elevational view, partly in section, of a pump nozzle made up from the parts shown in FIGS. 1-11.

FIGS. 13 and 13a are schematic views of a pump nozzle in accordance with the invention in a closed position.

FIGS. 14 and 14a are views similar to FIGS. 13 and 13a but showing the nozzle in the open position.

Referring firstly to FIGS. 1, 2, 3 and 4 there is shown a rear segment 1 of the nozzle housing, which segment comprises an elongate cylindrical portion 2 having an open ended bore 3 formed therein coaxially therewith. The rear segment 1 has at one end a generally cylindrical terminal portion 4 of larger radius than the elongate portion and being radially offset therefrom. Within the terminal portion 4 the bore 2 is enlarged to form a cylindrical inlet opening 5 for the nozzle, the central axis A of the inlet 5 being radially offset from the central axis B of the bore 3, as shown in FIG. 3.

The other end of the rear segment 1 has formed therein an L-shaped slot 6 having a longitudinal arm 7 which extends rearwardly from the end of the segment, and a transverse arm 8 which extends circumferencially around the segment through an angle of approximately 135°, as shown in FIG. 2. A small transverse semicylindrical channel 9 is formed in part of the outer surface of the segment 1 towards the end thereof.

The front segment 10 of the nozzle housing is shown in FIG. 5 and comprises an elongate cylindrical portion 11 with a cylindrical bore 12 of equal diameter to the rear segment bore 3 formed therein. The central axis B of the bore 12 is radially offset from the central axis A' of the cylindrical portion 11 in which it is formed. A generally elliptical or eye-shaped aperture 13 is provided in an end wall 30 at one end of the segment 10, the aperture 13 being centered on the central axis A' of the segment and being radially offset from the central axis B' of the cylindrical bore 12. The other end of the segment is provided with a rectangular block 14 wherein the bore 12 is enlarged to form a cylindrical cavity 15 of similar diameter of the outer surface of the cylindrical portion 2 of the rear segment 1. The block 14 has a transverse bore 15 passing completely therethrough which intersects the outer surface of the cavity 15 and forms a semicylindrical channel 17 therein.

Turning now to FIGS. 8 and 9, the nozzle inner member 18 is illustrated. The member 18 comprises an elongate cylinder 19 having an open ended cylindrical bore 20 formed centrally therein. The outside diameter of the cylinder 19 is such that the cylinder 19 may fit snugly within the bores 3, 12 of the housing segments 1, 10, the length of the cylinder 19 being approximately equal to the total length of the segments 1, 10. At one end of the cylinder 18 there is formed an outlet opening 21. At the opening 21, one side of the cylinder 19 extends longitudinally beyond the other and the inside surface of the bore 20 is tapered inwardly. Thus, as shown in FIG. 9, the outlet opening 21 effectively has an eye-shaped cross-section of similar dimensions to the housing aperture 13 and is radially offset from the central axis B'' of the cylinder 19. The inner member 18 is further provided with a rectangular projection 29 which extends radially from the outer surface of the cylinder 19.

The final major component of the nozzle is a cylindrical sleeve 22, illustrated in FIGS. 10 and 11. The sleeve 22 has an open ended cylindrical bore 23 formed centrally therein, the bore 23 having a diameter similar to the outside diameter of the cylinder 2 of the housing rear segment. The surface of the sleeve 22 has formed thereon a spiral shaped cam surface 24 which extends longitudinally across almost the entire length of the sleeve and circumferencially through an angle of approximately 135°. At one end of the sleeve 22 there is formed a radially extending rectangular slot 25 which is of similar cross-section to the inner member rectangular projection 29.

The method of assembling the nozzle will now be described with particular reference to FIG. 12. The inner member 18 is placed in the bore of the housing front segment 10 so that the outlet 21 lies adjacent the aperture 13 and the rectangular projection 29 of the inner member abuts the rear face of the rectangular block 14 of the segment 10. The sleeve 22 is then slid over the cylindrical portion 2 of the rear segment 1 and positioned thereon so that the rear end of the sleeve 22 abuts the terminal portion 4 and the slot 25 of the sleeve lies above the point of intersection between the arms 7, 8 of the 'L' shaped slot of the rear segment 1. The rear segment 1 is then slid over the free end of the inner member 18 until the front end thereof abuts the rectangular projection 29. The inner member 18 is then rotated until the projection 29 falls into alignment with the longitudinal arm 7 of the 'L' shaped slot 6 and the front of the rear segment 1 is pushed into the cylindrical cavity 15, the arm 7 of the slot 6 defining a key way for the projection 29. Thus, the segments 1, 10 may be mated together as shown in FIG. 12 with the projection 29 passing through the transverse arm 8 of the 'L' shaped slot into the radial slot 25 formed at the end of the sleeve 22. The front end of the sleeve 22 abuts the block 14 and thus the end of the projection 29 is securely sandwiched within the radial slot 25. The nozzle may then conveniently be secured by means of a single tapered retaining pin 26 which is pushed through the transverse bore 16 in the rectangular block 14 and engages the transverse channel 9 of the rear segment 1 thus preventing any further relative movement between the housing segments 1, 10.

Rotation of the sleeve 22 about the rear segment 1 causes a like rotation of the rectangular projection 29 within the transverse arm 8 of the 'L' shaped slot 6 and a corresponding rotation of the inner member 18 about the central axis B, B' of the bores 3, 12 of the housing outer segments 1, 10. Therefore, the sleeve 22 may be rotated between an open position wherein the outlet 21 and the aperture 13 are in registry and fluid may pass freely through the inner member bore 20 from the inlet 5 and through the outlet 21, and a closed position wherein the end wall 30 covers the outlet 21 and flow out of the nozzle is cut off. A suitable sealing member such as an 'O' ring 27 is used to seal the interface between the inner member 18 and the rear segment 1 at the inlet. It can be readily appreciated from FIG. 12 that the central axis A' of the front segment 10 is aligned with the central axis A of the inlet opening, both being radially offset from the axis B of rotation of the inner member 18. Thus, as viewed externally the nozzle is symmetric about the axis A and this is particularly advantageous where the nozzle is to be used to inject material into an elongate mould cavity since the housing front segment 10 may be introduced centrally into the cavity and the outlet opening 13 will lie on the central elongate axis of the cavity. This helps to ensure that the cavity is filled evenly as fluid is pumped out of the opening.

FIGS. 13, 13a, 14 and 14a show schematically how an axially movable cam follower 28 may cooperate with the cam surface 24 to effect a rotation of the sleeve 22 and the inner member between the open and closed positions. In FIGS. 13, 13a the cam follower 28 is disposed at the rear of the cam surface 24 and the openings 13, 21 are just out of alignment. If the cam follower 28 is then moved axially to the position shown in FIG. 14, the sleeve 22 and the inner member are rotated through an angle of approximately 135° and the openings 13, 21 are aligned.

Where the nozzle is used to a pump viscous fluid such as meat paste into an elongate mould, means are arranged to introduced the front member 10 into the mould in the closed position of FIGS. 13, 13a. The cam follower 28 is then moved axially to the open position shown in FIGS. 14, 14a and fluid is pumped into the mould. As the mould is filled the nozzle is gradually withdrawn until the required amount of fluid has been pumped into the mould whereupon the cam follower is moved back to the position shown in FIG. 13 and the nozzle is closed. Thus, the aforesaid problems concerning spillage from the nozzle may be overcome since the nozzle may be opened or closed within the mould cavity even though the cavity may be of restricted dimensions.

It should be appreciated that the cross section of the outlet 21 and the aperture 13 need not necessarily be eliptical although it will be understood from viewing FIG. 13a that eliptical openings of appropriate dimensions provide the maximum outlet aperture in the open position while retaining a position of no overlap in the closed position and while being symmetrical. For example, if circular openings were used, the diameter thereof would have to be less than the radius of the inner member cavity otherwise the openings would always overlap to a certain extent regardless of their relative rotational positions. It can be seen from FIG. 13a that the eliptical openings retain a position of no overlap and are substantially larger than circular openings having a diameter less than the radius of the bore.

The nozzle is constructed from relatively few separate parts and is easy and quick to assemble; the manufacturing costs are therefore relatively low.

I claim:

1. A nozzle for a pump comprising a tubular inner member having an inlet connectable to a pump and an axially directed outlet, an elongate housing having an end wall, the end wall being provided with an axially directed aperture having a centre of symmetry lying on the central longitudinal axis of the housing, the housing being adapted for insertion into an elongate mould cavity so that said central longitudinal axis of the housing is coaxial with that of the mould cavity, the tubular inner member being rotatably mounted within the housing for rotation about an axis which is spaced from said central longitudinal axis of the housing so as to either bring the aperture and outlet into registry or to close the outlet by means of the end wall.

2. A nozzle as claimed in claim 1 wherein the outlet and the end wall aperture are of similar cross-sectional shape.

3. A nozzle as claimed in claim 1 wherein the outlet and the end wall aperture are generally eye-shaped in cross-section.

4. A nozzle as claimed in claim 1 wherein a tubular sleeve is rotatably mounted on the housing towards the rear end thereof, the sleeve being coupled to the tubular inner member whereby rotation of the sleeve causes a like rotation of the inner member.

5. A nozzle as claimed in claim 4 wherein the sleeve has a cam surface formed along its length shaped as part of a helix and a cam follower co-operates with the cam surface such that axial relative movement of the cam follower and sleeve causes rotation of the sleeve.

6. A nozzle as claimed in claim 5 wherein actuating means for moving the cam follower is incorporated in means for introducing the nozzle into and removing the nozzle from a mould.

7. A nozzle as claimed in claim 4 wherein the housing comprises separate front and rear segments which are matingly interengageable and the inner member has a radial projection attached thereto which extends through an elongate circumferential slot or keyway formed in the rear segment and engages the sleeve, which is carried by the rear segment.

* * * * *